D. E. DUTROW.
Butter Printing-Machines.
No. 135,323.  Patented Jan. 28, 1873.
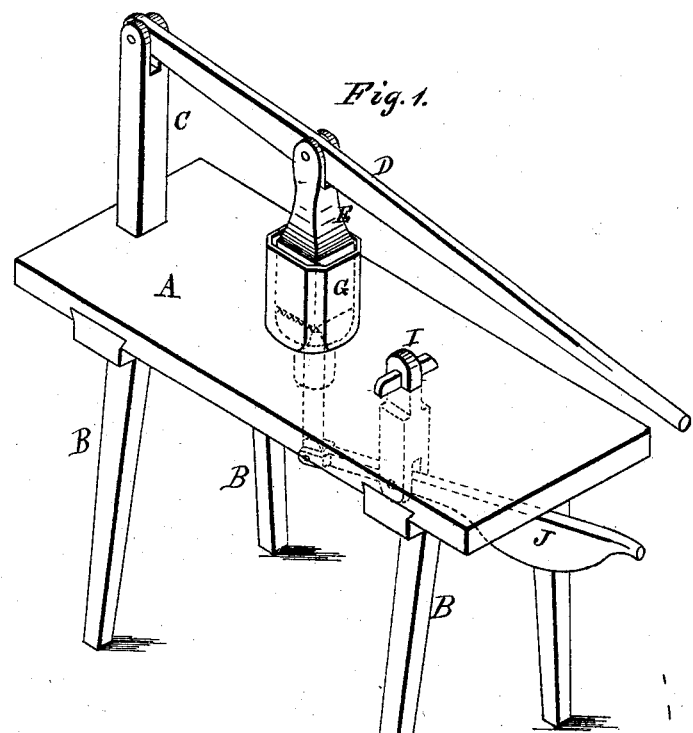
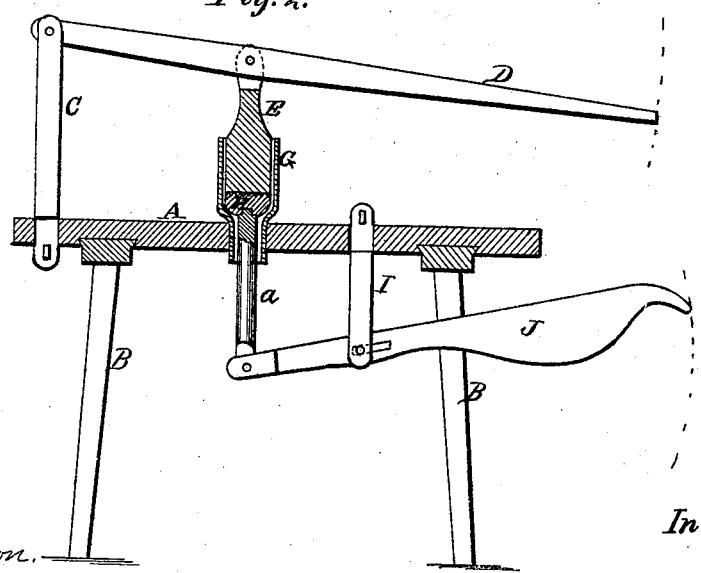
Witnesses:
Charles J. Herron.
James L. Dutrow
Inventor
David E. Dutrow

UNITED STATES PATENT OFFICE.

DAVID E. DUTROW, OF WASHINGTON, DISTRICT OF COLUMBIA.

IMPROVEMENT IN BUTTER-PRINTING MACHINES.

Specification forming part of Letters Patent No. 135,323, dated January 28, 1873.

*To all whom it may concern:*

Be it known that I, DAVID E. DUTROW, of Washington, in the District of Columbia, have invented certain new and useful Improvements in Butter-Printing Machines; and do hereby declare the following to be a full, clear, and exact description thereof, reference being had to the accompanying drawing and to the letters of reference marked thereon.

Machines for making print-butter of roll or keg butter have long been in use, but they have heretofore been defective in that the operator invariably had to elevate or remove the print from the hopper before he could determine if the work was performed properly or not. Another objection has been that hard butter had always to be worked over first, which is a very detrimental operation to butter.

To overcome these objections is the object of my invention; and to this end the nature of my invention consists in making the hopper, in which the butter is placed and printed, of glass or other suitable transparent material, which will enable the operator to see at all times how the work is being performed; it also will allow hard butter to be pressed into the print, and the mold can be easier kept clean.

In order to enable others skilled in the art to which my invention appertains to make and use the same, I will now proceed to describe its construction and operation, referring to the annexed drawing, which forms a part of this specification, and in which—

Figure 1 is a perspective view, and Fig. 2 is a longitudinal vertical section, of my machine.

A represents a bench or table supported upon legs B B. At or near one end of the bench A is a standard, C, the upper end of which is forked, and has a lever, D, pivoted in said fork. This lever extends to and beyond the other end of the table, where the operator is placed, and at a suitable point on the lever is suspended the plunger E; the upper end of the same being forked, the lever D is placed in the fork and pivoted, as shown. The plunger E passes perpendicularly downward into the hopper G, which is fastened, by any suitable means, upon the bench or table A. This hopper is made of glass, which will allow the operator to see the butter during the whole operation of printing; and hence he need not take the print out to see if it is properly done. The glass will also enable him to print hard butter without first warming and working the same, which soon causes it to become rancid.

Other transparent material might perhaps be substituted, and, although I prefer to use glass for this purpose, I do not desire to confine myself exclusively to said material, but reserve the right to use any transparent substance of which the hopper may be made.

Within the hopper is the print H, attached to or formed upon the upper end of a rod, a, which passes downward through the center of the hopper and through the table, its lower end being pivoted to the inner end of a treadle, J, pivoted to a post, I, under the table. The outer end of this treadle is weighted, as shown, so that, after the plunger has been forced down and the butter printed, and then the plunger raised, the weighted end of the treadle will fall and raise the print and printed butter up to the top of the hopper, when the butter is removed and another piece put in the hopper.

Having thus fully described my invention, what I claim as new, and desire to secure by Letters Patent, is—

1. In a machine for printing butter, the hopper in which the plunger operates, when said hopper is made of glass or other transparent material, substantially for the purposes herein set forth.

2. The combination of a hopper, a follower for pressing the butter down, and a movable print for receiving the butter and throwing it up after it is printed, substantially as herein set forth.

In testimony that I claim the foregoing I have hereunto set my hand.

DAVID E. DUTROW.

Witnesses:
CHARLES S. HERRON,
JAMES Q. DUTROW.